UNITED STATES PATENT OFFICE.

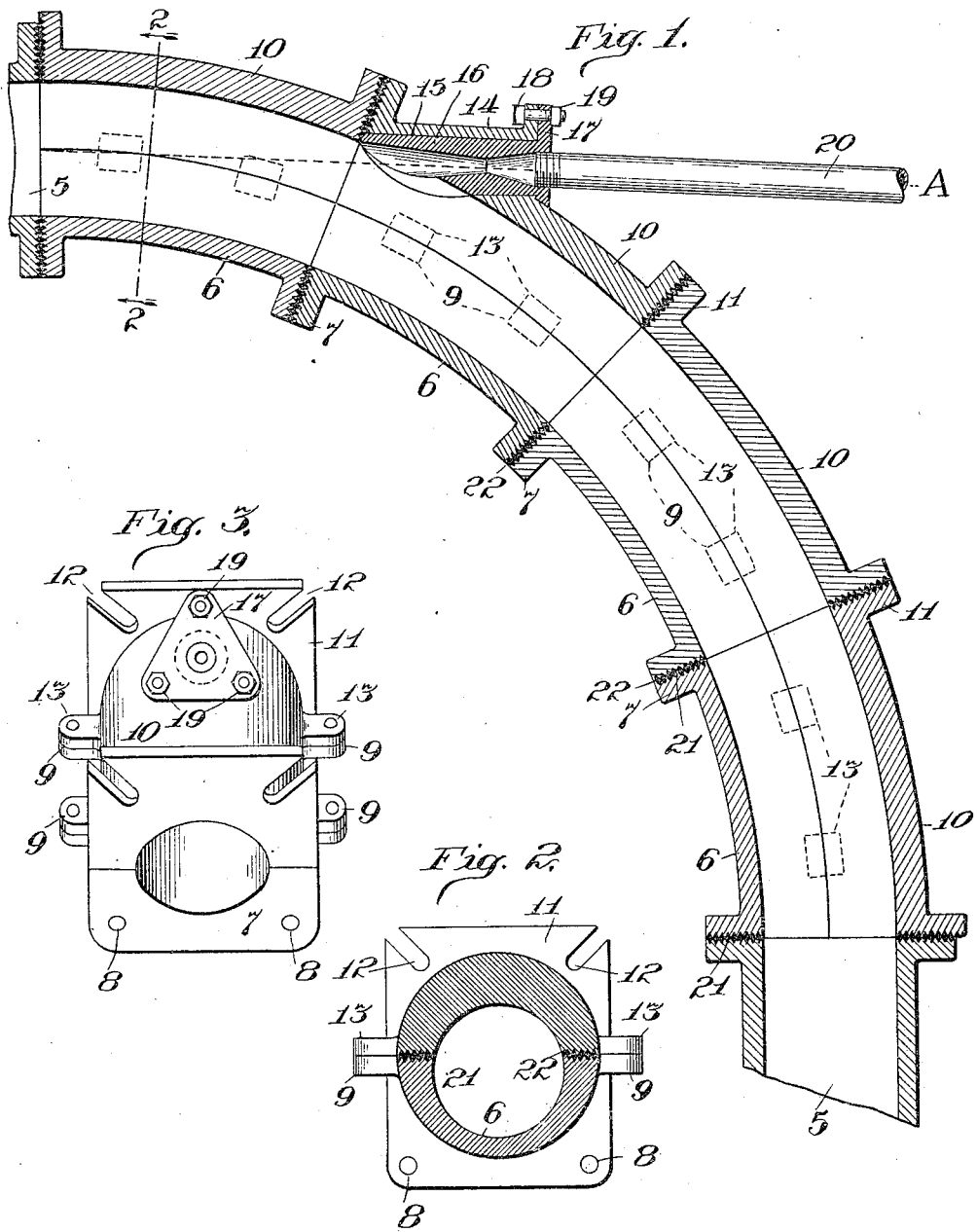

ALEXANDER GIRTANNER, OF NEW YORK, N. Y., ASSIGNOR TO AMERICAN STEAM CONVEYOR CORPORATION, OF CHICAGO, ILLINOIS, A CORPORATION OF NEW YORK.

ASH-CONVEYER.

1,272,794.  Specification of Letters Patent.  Patented July 16, 1918.

Application filed February 12, 1917. Serial No. 148,102.

*To all whom it may concern:*

Be it known that I, ALEXANDER GIRTANNER, a citizen of the United States, residing at New York, in the county of New York and State of New York, have invented a certain new and useful Improvement in Ash-Conveyers, of which the following is a full, clear, concise, and exact description, reference being had to the accompanying drawings, forming a part of this specification.

My invention relates to an ash conveyer and more particularly to the manner of forming the curved portion of the conduit of such conveyer.

In the accompanying drawings, which illustrate an ash conveyer made in accordance with my invention, Figure 1 is a longitudinal section;

Fig. 2 is a cross section taken on the line 2—2 of Fig. 1; and

Fig. 3 is a view of one of the transverse sections of the conveyer showing a slight modification.

Like marks of reference refer to similar parts in the several views of the drawings.

At 5—5 are shown the straight portions of the conveyer conduit which are connected by means of the curved portion embodying the present invention. The curved portion of the conveyer conduit is divided both transversely and longitudinally into separable sections. 6 represents the inner sections which are four in number and are, in all respects, exactly alike. Each of these sections is provided at each end with a flange 7 having bolt holes 8, and at the side with lugs 9 adapted to secure the section to the corresponding outer section 10. Each of the outer sections 10 is provided at each end with a flange 11 having slots 12, and with lugs 13 adapted to be secured to the lugs 9 of the members 6. One of the outer sections 10 differs from the remaining sections in being provided with an enlarged portion 14 having a nozzle opening 15 in which is situated the nozzle 16 terminating flush with the interior of the conduit. This nozzle 16 is provided with a flange 17 and is secured to the enlarged portion 14 by bolts 18 and nuts 19. Threaded into the outer end of the nozzle 16 is a steam pipe 20 for delivering steam through the nozzle into the curved portion of the conduit. The nozzle 16 and pipe 20 are so located that their common axis is substantially in alinement with the axis of the straight portion 5 of the conduit as indicated by the dotted line A in Fig. 1 of the drawings. Inasmuch as all of the members 10 are readily removable to be replaced by new members, it will be evident that when any part of the curved portion of the pipe becomes worn, it may be readily removed. Furthermore, as all of the parts 10 are interchangeable when more or less than a quarter turn is made by the curved portion of the pipe, the position of the member 10 carrying the nozzle can be changed so as to bring the nozzle substantially in alinement with the axis of the straight portion of the conduit. In order to secure a tight joint between the various members 6 and 10, I provide their juxtaposing surfaces with grooves 21 and place between said surfaces a filling 22 of plastic material such, for instance, as a mixture of asbestos and Portland cement. While this construction secures a perfectly tight joint the other improvements characterizing my invention may be used without it and, in Fig. 3 of the drawings, I have shown the juxtaposing surfaces as being formed plain.

Having thus described my invention what I claim as new and desire to secure by Letters Patent of the United States is:

1. In an ash conveyer, the combination with a conduit having a curved portion and a straight portion, the outer part of said curved portion being formed of a plurality of removable members, of a nozzle carried by one of said removable members, all of said removable members being interchangeable, whereby the axis of said jet may be brought into substantial alinement with the axis of any portion of said conduit.

2. In an ash conveyer, the combination with a conduit divided both longitudinally and transversely into interchangeable removable members, of a nozzle carried by one of said removable members.

In witness whereof I hereunto subscribe my name this 24th day of January, A. D. 1917.

ALEXANDER GIRTANNER.

Witnesses:
A. G. McCALEB,
MARY A. COOK.

Copies of this patent may be obtained for five cents each, by addressing the "Commissioner of Patents, Washington, D. C."